United States Patent
Song et al.

(10) Patent No.: US 9,099,952 B2
(45) Date of Patent: Aug. 4, 2015

(54) APPARATUS AND METHOD FOR CONTROLLING SWITCHING DEVICES FOR DC MOTOR

(75) Inventors: Ho Deuk Song, Seoul (KR); Sang Hyun Jang, Gyeonggi-do (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 573 days.

(21) Appl. No.: 13/425,708

(22) Filed: Mar. 21, 2012

(65) Prior Publication Data

US 2013/0147409 A1 Jun. 13, 2013

(30) Foreign Application Priority Data

Dec. 12, 2011 (KR) .................. 10-2011-0132559

(51) Int. Cl.
  *H02P 6/14* (2006.01)
  *H02P 7/29* (2006.01)
  *H02M 1/38* (2007.01)
(52) U.S. Cl.
  CPC ... *H02P 7/29* (2013.01); *H02M 1/38* (2013.01)
(58) Field of Classification Search
  CPC ............. H02P 6/14; H02P 6/08; H02P 6/001; H02K 29/00; H02K 29/08
  See application file for complete search history.

(56) References Cited

U.S. PATENT DOCUMENTS

| | | | |
|---|---|---|---|
| 5,578,911 A | 11/1996 | Carter et al. | |
| 8,665,003 B2* | 3/2014 | Ueda et al. ................... | 327/393 |
| 2006/0152204 A1* | 7/2006 | Maksimovic et al. ........ | 323/284 |
| 2007/0273312 A1 | 11/2007 | Sakurai et al. | |
| 2007/0285046 A1 | 12/2007 | Yamaguchi et al. | |
| 2008/0298784 A1* | 12/2008 | Kastner ........................ | 388/811 |
| 2011/0121804 A1* | 5/2011 | Kudo ............................. | 323/282 |
| 2011/0215729 A1* | 9/2011 | Feldtkeller .................... | 315/224 |
| 2011/0227554 A1* | 9/2011 | Hokomoto et al. ........... | 323/311 |

FOREIGN PATENT DOCUMENTS

| | | |
|---|---|---|
| JP | 09331692 A | 12/1997 |
| JP | 2005278386 A | 10/2005 |
| JP | 2009254201 A | 10/2009 |
| KR | 10-0147721 | 5/1998 |

* cited by examiner

*Primary Examiner* — Shawki S Ismail
*Assistant Examiner* — Zoheb Imtiaz
(74) *Attorney, Agent, or Firm* — Mintz Levin Cohn Ferris Glovsky and Popeo, P.C.; Peter F. Corless

(57) ABSTRACT

Disclosed is an apparatus and method for controlling switching devices for a DC motor, which controls the dead-time in an on-chip manner, even when a microcontroller is not mounted in a vehicle controller, by providing a semiconductor chip for controlling switching devices for a DC motor. More specifically, switching devices are mounted in a semiconductor chip to configure an internal circuit of the chip with a half-bridge and a dead-time controller is provided on the semiconductor chip and is configured to transmit gating signals by controlling dead-time periods during operation of the switching devices and drive the switching devices directly connected to a motor.

7 Claims, 4 Drawing Sheets

APPARATUS AND METHOD FOR CONTROLLING SWITCHING DEVICES FOR DC MOTOR

CROSS-REFERENCE TO RELATED APPLICATION

This application claims under 35 U.S.C. §119(a) the benefit of Korean Patent Application No. 10-2011-0132559 filed Dec. 12, 2011, the entire contents of which are incorporated herein by reference.

BACKGROUND (a) Technical Field

The present invention relates to an apparatus and method for controlling switching devices for a DC motor. More particularly, it relates to an apparatus and method for controlling switching devices for a DC motor, which can control dead-time using a hardware circuit design.

(b) Background Art

Typically, a three-phase pulse width modulation (PWM) inverter is used as a power converter for supplying a three-phase alternating current to a DC motor having a high power output in a hybrid vehicle. In a half-bridge circuit for driving the DC motor, two metal-oxide-semiconductor field-effect transistor (MOSFET) switching devices can switch independently between each other. However, when the two devices are turned on at the same time, the DC output is short-circuited, and a large amount of current flows therethrough, which is capable of destroying the devices. Accordingly, the switching devices operate in a complementary switching manner such that the on/off states of the two devices are opposite of each other at any given time.

Nevertheless, during on/off switching of the two devices, there is a possibility that the two devices may be both on at the same time due to a difference in propagation delay time of gating signals and because of a difference between the time during which the semiconductor switching device is turned on and the time during which the semiconductor switching device is turned off.

In particular, the time during which the switching device is turned off is always longer than the time during which the switching device is turned on, and thus, when the gating signals for switching the on/off states of the two devices are applied at the same time, the two devices may be both on at the same time thereby causing an unwanted short circuiting incident, thus resulting in power loss.

As such, in order to prevent this unwanted short circuiting incident during the on/off switching of the two devices, a turn-on signal is applied to the device to be turned on after a predetermined time has elapsed, thereby ensuring the other devices is turned off appropriately. The time during which the turn-on signal is delayed is called the dead-time.

Typically in vehicles, a controller provided with a microcontroller controls the dead-time via a software program. However, if the controller is not equipped with a microcontroller, the dead-time cannot be controlled via a software program, and thus it is necessary to provide appropriate countermeasures.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method for controlling switching devices for a DC motor, which can control the dead-time in an on-chip manner, even when a microcontroller is not mounted in an existing vehicle controller, by providing a semiconductor chip for controlling switching devices for a DC motor.

In one aspect, the present invention provides an apparatus for controlling switching devices for a direct current (DC) motor, the apparatus comprising: switching devices mounted in a semiconductor chip to configure an internal circuit of the chip with a half-bridge; and a dead-time controller provided on the semiconductor chip and configured to transmit gating signals by controlling dead-time periods during operation of the switching devices and operate the switching devices directly connected to a motor. In some exemplary embodiments, the switching devices may comprise a pair of MOSFETs operating in pairs, and the dead-time controller may include a clock generator, a frequency divider, a detector, a counter, and a time delayer to apply the dead-time between the two switching devices.

In another aspect, the present invention provides a method for controlling switching devices for a direct current (DC) motor, the method including: generating a clock signal by the controller; dividing the frequency of the clock signal by the controller; detecting, by the controller, a phase difference between a clock signal input to the frequency divider and a clock signal divided by the frequency divider and generating, by a controller, an up signal or a down signal; generating, by the controller, a control bit by counting the up/down signals; and applying, by the controller, a dead-time in a manner to delay an on signal during switching of two switching devices operating in pairs based on the control bit to achieve complementary switching operations.

In an exemplary embodiment, an up counter for counting the up signals and a down counter for counting the down signals may be designed to be symmetrical to each other such that the counting is performed in the same range. Additionally, the dead-time may be determined based on the counting number of up signals or down signals. The dead-time period applied between two switching devices operating in pairs may be shorter than the dead-time period applied between two switching devices operating in other pairs.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
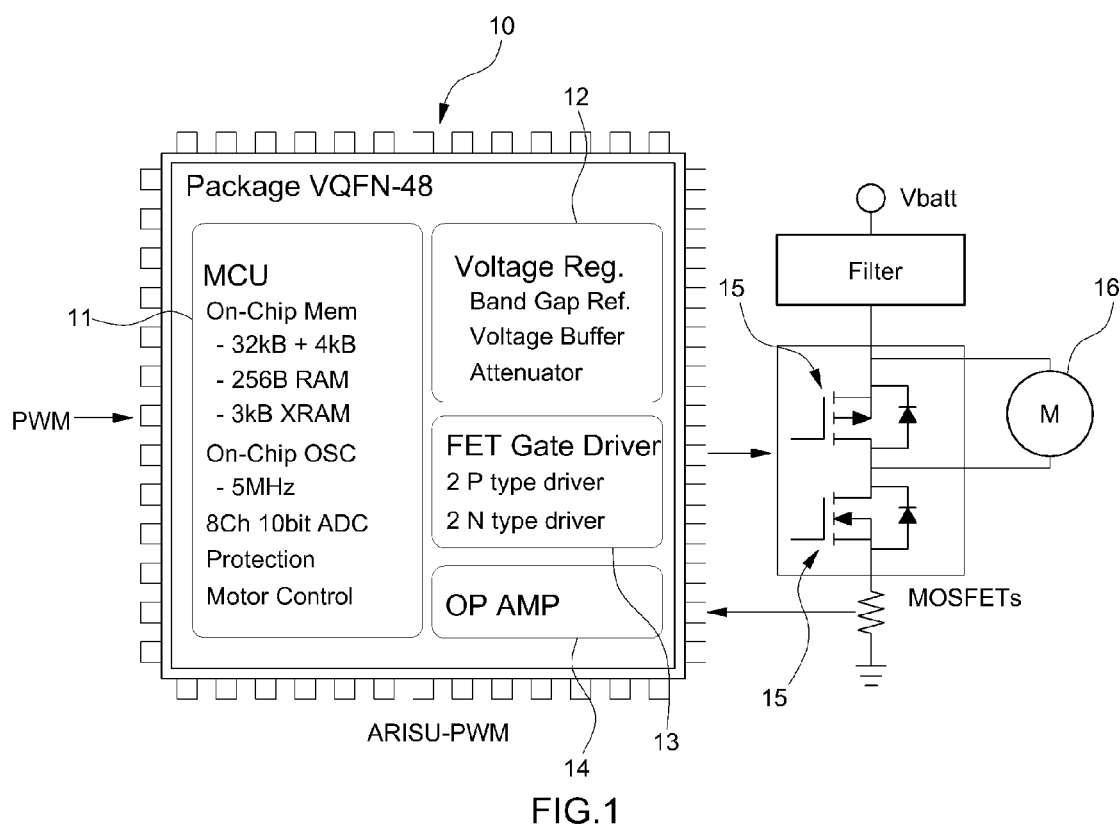
FIG. 1 is a schematic diagram showing a semiconductor chip for controlling switching devices for a DC motor in accordance with an exemplary embodiment of the present invention.

Reference numerals set forth in the Drawings includes reference to the following elements as further discussed below:

10: semiconductor chip
11: MCU
12: voltage regulator
13: FET gate driver 14: amplifier
15: MOSFET
16: DC motor
20: dead-time controller
21: reset device
22: clock generator
23: frequency divider
24: detector
25: counter
26: time delayer
27 & 28: MOSFETs
27a: first MOSFET
27b: second MOSFET
28a: third MOSFET
28b: fourth MOSFET
40: clock signal
41: signal waveform It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Figure 2:
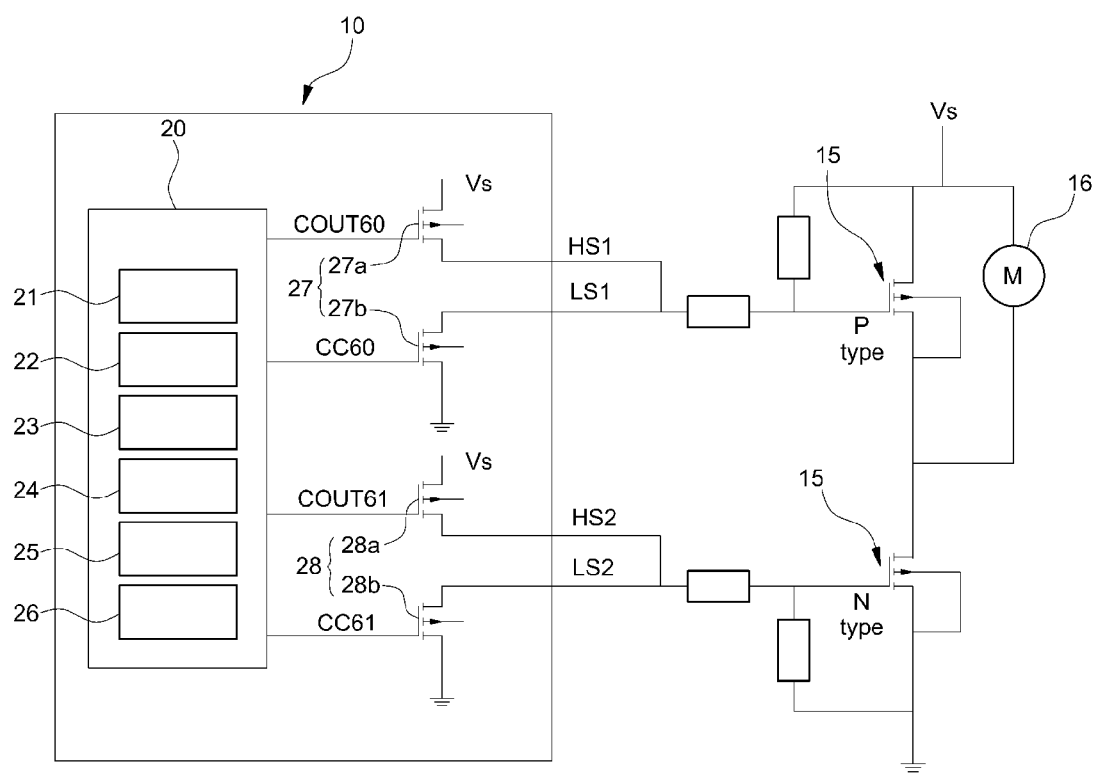
FIG. 2 is a diagram showing a circuit for controlling FET devices in accordance with an exemplary embodiment of the present invention.

FIG. 1 is a schematic diagram showing a semiconductor chip for controlling switching devices for a DC motor in accordance with an exemplary embodiment of the present invention, and FIG. 2 is a diagram showing a circuit for controlling FET devices in accordance with an exemplary embodiment of the present invention. The present invention provides an apparatus and method for controlling switching devices for a DC motor, which can control the dead-time via an on-chip hardware circuit design, rather than a software program which requires a microcontroller. The apparatus for controlling switching devices for a DC motor in accordance with an exemplary embodiment of the present invention may configure a field effect transistor (FET) gate driver 13 and a half-bridge or full-bridge as an essential internal circuit on a pulse width modulation (PWM) control semiconductor chip 10.

The PWM control semiconductor chip 10 may be further provided with a, e.g., 4 kB memory in a 32 kB memory and may comprise a motor control unit (MCU) 11 provided with a, e.g., 256 B RAM, a 3 kB XRAM, an oscillator, an AD converter, etc., a voltage regulator 12, an FET gate driver 13, an amplifier (OP AMP) 14, etc.

Using the configuration of the PWM control semiconductor chip 10, it is possible to configure a dead-time controller 20. The controller 20 may include a clock generator 22, a frequency divider 23, a detector 24, a counter 25, and a time delayer 26, and two half-bridges as an internal circuit. The dead-time controller 20 generates gating signals COUT60, CC60, COUT61, and CC61 to be applied to two MOSFETs 27 and 28 composed of the two half-bridges and may switch two complementary switching states such that the on/off states of the two MOSFETs 27 and 27 are different from each other. Here, the gating signals COUT60 and CC60 are sent to one pair of first and second MOSFETs 27a and 27b, and the gating signals COUT61 and CC61 are sent to the other pair of third and fourth MOSFETs 28a and 28b.

The internal circuit is composed of the two half-bridges as indicated in the inside of the rectangular box of FIG. 1 and two MOSFETs 27 and 28 (i.e., switching devices) operate in pairs in each half-bridge.

As shown in FIG. 1, a P-channel MOSFET 15 and an N-channel MOSFET 15 connected to the half-bridges of the internal circuit, respectively, are provided in the outside of the rectangular box of FIG. 1. The P-channel MOSFET 15 and the N-channel MOSFET operate in pairs, and the P-channel MOSFET 15 is directly connected to a DC motor 16 to control the DC motor 16.

Here, it is necessary to control the internal dead-time so as to prevent the first and second MOSFETs 27a and 27b or the third and fourth MOSFETs 28a and 28b, which operate in pairs, respectively, from operating at the same time in the internal circuit and to control the external dead-time so as to prevent one of the first and second MOSFETs 27a and 27b or one of the third and fourth MOSFETs 28a and 28b, from operating at the same time.

The internal dead-time represents a dead-time for preventing the two MOSFETs 27 and 28, which operate in pairs, from operating at the same time in the internal circuit, and the external dead-time represents a dead-time for preventing two MOSFETs 27a and 28a, which operate separately in other pairs, from operating at the same time. In the exemplary embodiment of the present invention, the internal dead-time period may be determined as, e.g., 4 bits, and the external dead-time period may be determined as, e.g., 8 bits.

The dead-time controller 20 is configured as a hardware circuit design and comprises a reset device 21 for resetting the clock signal, the clock generator 22 for generating a clock signal having a predetermined frequency, the frequency divider 23 for dividing the frequency, the detector 24 for detecting a phase difference between clock signals 40 and generating up/down signals, the counter 25 for performing counting on the up/down signals, and the time delayer 26 for delaying the time of an on signal to control the dead-time. Here, the clock signal is used to incorporate at least two circuit operations and has a predetermined frequency.

A method for controlling the dead-time of the apparatus for controlling the DC motor configured in the above manner will be described below.

Figure 3:
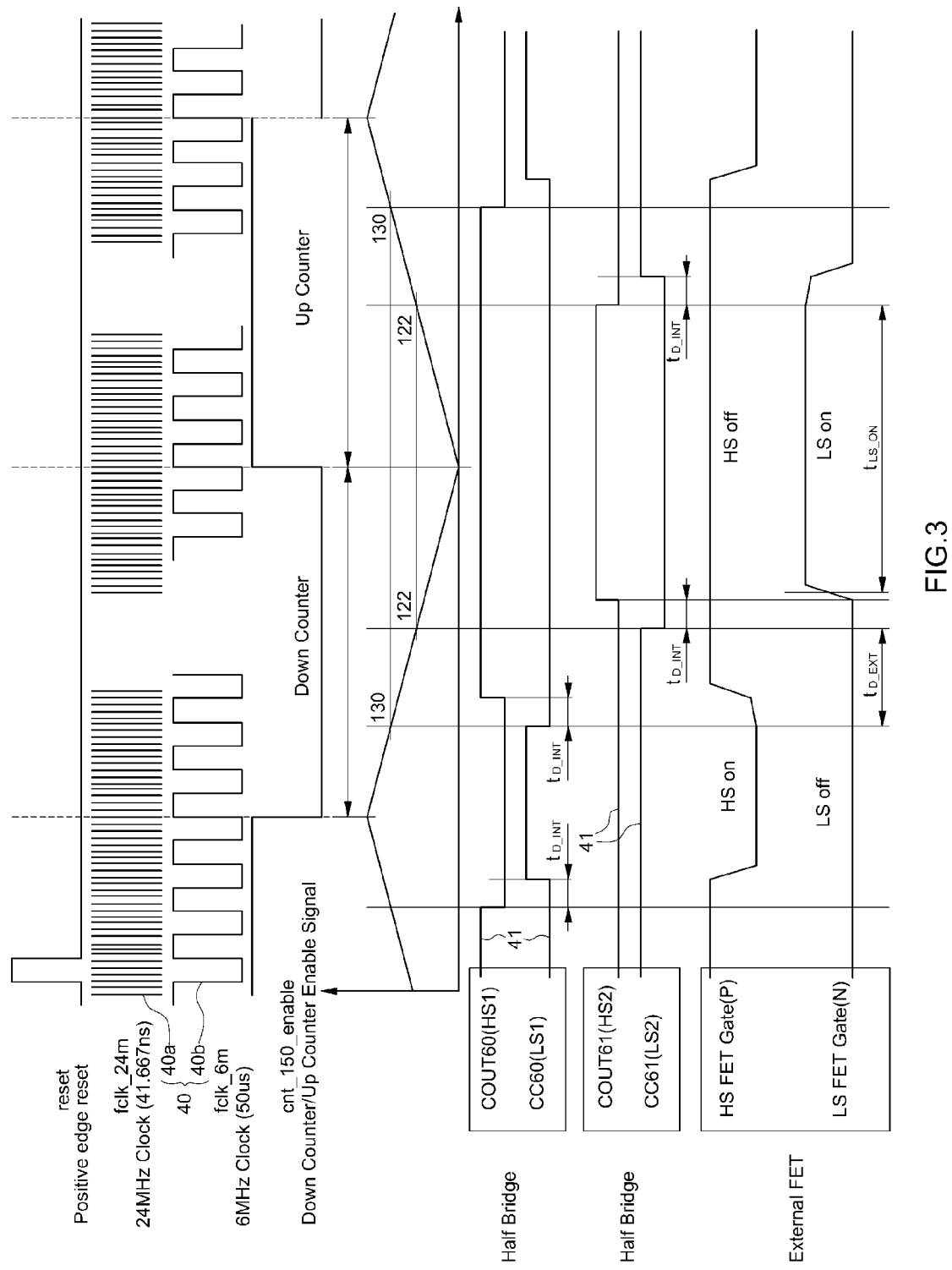
FIG. 3 is a timing diagram for dead-time control in accordance with an exemplary embodiment of the present invention.
Figure 4:
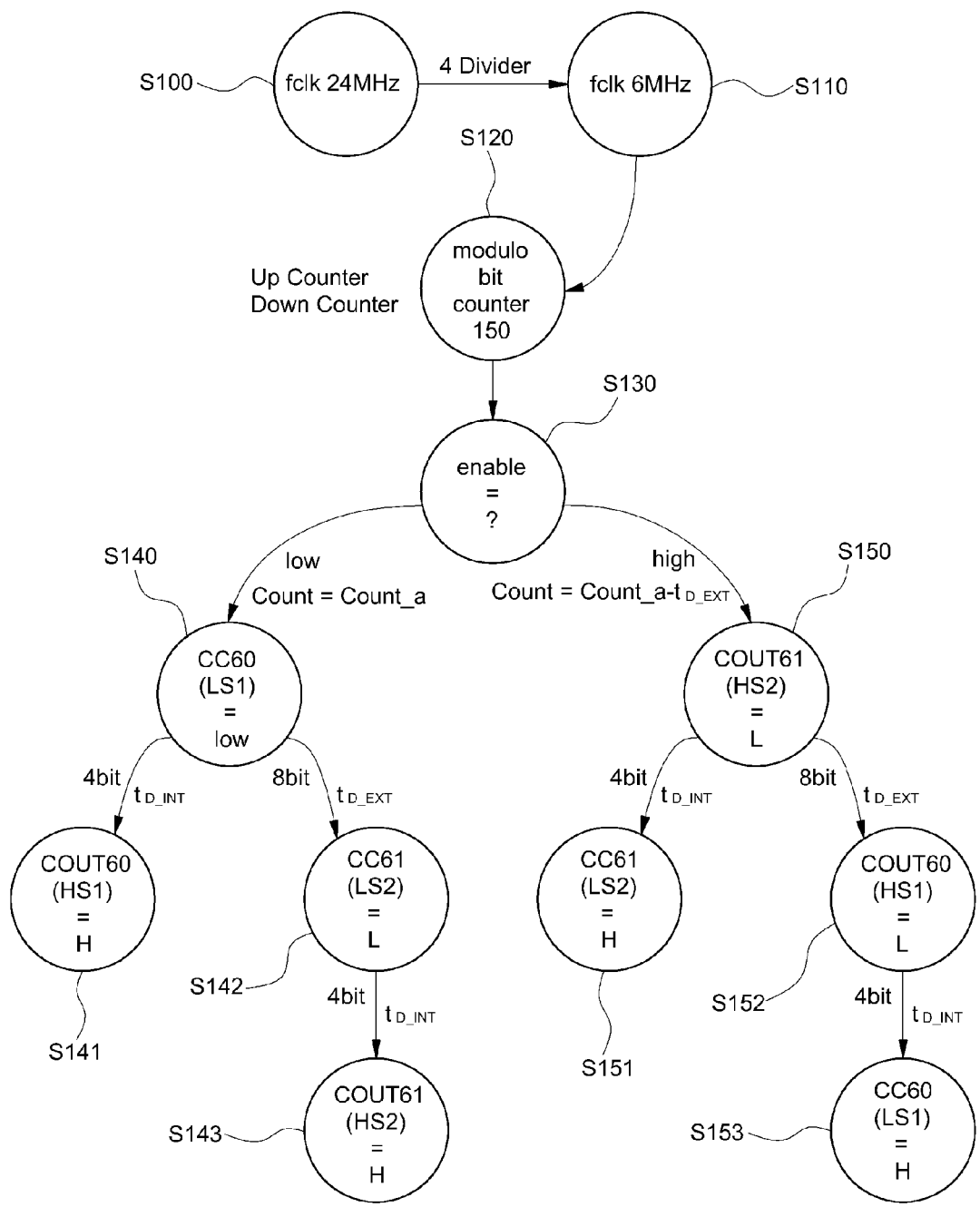
FIG. 4 shows a dead-time control algorithm in accordance with an exemplary embodiment of the present invention.

FIG. 3 is a timing diagram for dead-time control in accordance with an exemplary embodiment of the present invention, and FIG. 4 shows a dead-time control algorithm in accordance with an exemplary embodiment of the present invention. First, the clock signal generated by the clock generator 22 is reset to remove frequency noise and start the dead-time control. Then, the clock signal of, e.g., 24 Hz generated by the clock generator 22 is divided by four via the frequency divider 23 to use a frequency of, e.g., 6 Hz (S100 and S110). Subsequently, the detector 24 detects a phase difference between a first clock signal 40a input to the frequency divider 23 and a second clock signal 40b divided by the frequency divider 23. The detector 24 generates an up signal when the phase of the first clock signal 40a leads the phase of the second clock signal 40b and generates a down signal when the phase of the second clock signal 40b leads the phase of the first clock signal 40a (S120 and S130).

Continuously, the counter 25 receives the up/down signals generated by the detector 24 and counts the received up/down signals to generate a control bit to be applied to the time delayer 26 (S140 and S150). Here, the counting the up/down signals is performed in the range of, e.g., 1 to 150. The reason for this is that the generation period of the dead-time falls within the above-mentioned counting range. Here, an up counter 25 and a down counter 25 are designed to be symmetrical to each other so as to facilitate the calculation based on the counting.

For example, in order to measure 5 and 296 in a counter increasing from 1 to 300, when the counter is divided into 300 steps and symmetrically designed to an up counter (1 to 150) and a down counter (150 to 1), and when measuring a period of 4, it is possible to measure points 5 and 296 which are spaced equally from numerals 1 and 300 at both ends. Thus, the hardware circuit design is simplified and its control is facilitated. Then, the time delayer 26 receives the control bit generated by the counter 25 and controls the dead-time (for delaying the on signal) applied to each of the MOSFETs 27 and 28 based on the received control bit.

The dead-time control method will be described in more detail with reference to FIGS. 3 and 4 below.

As shown in FIG. 3, the up/down signals (i.e., up counter/down counter enabled signals) detected by the detector 24 are designed to be symmetrical with respect to 0 such that the counter 25 is divided into a down counting period where the counting starts from the highest counting position and an up counting period where the counting starts from the lowest counting position.

For example, referring to a signal waveform 41 of the gating signals CC60 and COUT60 in the down counting period, the gating signal CC60 applied from the dead-time controller 20 to the second MOSFET 27b is converted from high (1, ON) to low (0, OFF) when counted from the highest counting position 150 to 130, and then the gating signal COUT60 applied to the first MOSFET 27a is converted from low (0) to high (1) when counted from 130 to 126, i.e., after the internal dead-time ($t_{D\_INT}$, 4 bits) has elapsed (S140 and S141).

Moreover, referring to the signal waveform 41 of the gating signals CC60 and CC61, the gating signal CC60 applied from the dead-time controller 20 to the second MOSFET 27b is converted from high (1, ON) to low (0, OFF) when down counted to 130 in the down counting period, and then the gating signal CC61 applied to the fourth MOSFET 28b is converted from high (1) to low (0) when counted from 130 to 122, i.e., after the external dead-time ($t_{D\_INT}$, 8 bits) has elapsed (S140 and S142).

Furthermore, referring to the signal waveform 41 of the gating signals CC61 and COUT61, the gating signal CC61 applied from the dead-time controller 20 to the fourth MOSFET 28b is converted from high to low when down counted to 122, and the gating signal COUT61 applied to the third MOSFET 28a is converted from low to high when counted from 122 to 118, i.e., after the internal dead-time (4 bits) has elapsed (S142 and S143).

Furthermore, referring to the signal waveform 41 of the gating signals COUT61 and CC61 in the up counting period, the gating signal COUT61 applied from the dead-time controller 20 to the third MOSFET 28a is converted from high (1, ON) to low (0, OFF) when counted from the lowest counting position 0 to 122, and then the gating signal CC61 applied to the fourth MOSFET 28b is converted from low (0) to high (1) when counted from 122 to 126, i.e., after the internal dead-time ($t_{D\_INT}$, 4 bits) has elapsed (S150 and S151).

Moreover, referring to the signal waveform 41 of the gating signals COUT61 and COUN60, the gating signal COUT61 applied from the dead-time controller 20 to the third MOSFET 28a is converted from high (1, ON) to low (0, OFF) when counted to 122 in the up counting period, and then the gating signal COUT60 applied to the first MOSFET 27a is converted from high (1) to low (0) when counted to 130, i.e., after the external dead-time ($t_{D\_INT}$, 8 bits) has elapsed (S150 and S152).

Furthermore, referring to the signal waveform 41 of the gating signals COUT60 and CC60, the gating signal COUT60 applied from the dead-time controller 20 to the first MOSFET 27a is converted from high to low when counted to 130 in the up counting period, and the gating signal CC60 applied to the second MOSFET 27b is converted from low to high when counted from 130 to 134, i.e., after the internal dead-time (4 bits) has elapsed (S152 and S153). Here, the internal dead-time is applied between the first and second MOSFETs 27a and 27b, which operates in pairs, and the external dead-time is applied between the second MOSFET 27b and the fourth MOSFET 28b, which operate in other pairs, or between the first MOSFET 27a and the third MOSFET 28a, which operate in other pairs.

Therefore, according to the present invention, the dead-time controller 20 ensures the complementary operation between the two devices to prevent power loss in such a manner that one device is turned off and the other device is turned on after the dead-time (e.g., 4 bits) has elapsed by applying the internal dead-time during operation of one pair of first and second MOSFETs 27a and 27b (or third and fourth MOSFETs 28a and 28b) and applying the external dead-time during operation of the other pair of first and third MOSFETs 27a and 28a (or second and fourth MOSFETs 27b and 28b).

Moreover, since the dead-time period is controlled by integrating the on-chip hardware circuit design into the semiconductor chip 10, it is possible to eliminate the software control which requires a microcontroller and thus optimizes the system and software load. Furthermore, it is possible to control the internal/external dead-time periods when the input PWM duty is changed.

As described above, the apparatus and method for controlling switching devices for a DC motor according to the present invention has the following advantages. First, since the dead-time period can be controlled by integrating the on-chip hardware circuit design into the semiconductor chip, it is possible to eliminate the software control by the existing microcontroller and optimize the system and software load. Second, it is possible to control the internal/external dead-time periods when the input PWM duty is changed. Third, it is possible to ensure the complementary operation between the two devices to prevent power loss in such a manner that one device is turned off and the other device is turned on after the dead-time (e.g., 4 bits) has elapsed by applying the internal dead-time during operation of one pair of first and second MOSFETs (or third and fourth MOSFETs) and applying the external dead-time during operation of the other pair of first and third MOSFETs (or second and fourth MOSFETs).

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for controlling switching devices for a direct current (DC) motor, the apparatus comprising:

first switching devices mounted in a semiconductor chip to configure an internal circuit of the semiconductor chip with two half-bridges; and a dead-time controller provided on the semiconductor chip and configured to transmit gating signals directly to the first switching devices by controlling dead-time periods during operation of the first switching devices and operate second switching devices directly connected to a motor, the second switching devices mounted outside the semiconductor chip, wherein each of the two half-bridges includes two MOSFETs operating in pairs, the two half-bridges of the internal circuit are each connected to a P-channel MOSFET and an N-channel MOSFET provided on an outside of the internal circuit, the P-channel MOSFET and the N-channel MOSFET operate in pairs, and the P-channel MOSFET is directly connected to a DC motor to control the DC motor.

2. The apparatus of claim 1, wherein the first switching devices comprise a pair of MOSFETs operating in pairs, and the second switching devices comprise a P-channel MOSFET and an N-channel MOSFET provided on an outside of the internal circuit.

3. The apparatus of claim 1, wherein the dead-time controller comprises a clock generator, a frequency divider, a detector, a counter, and a time delayer to apply the dead-time between the two switching devices.

4. A method for controlling switching devices for a direct current (DC) motor, the method comprising:

mounting the switching devices in a semiconductor chip to configure an internal circuit of the semiconductor chip, wherein the switching devices include first and second MOSFETs and third and fourth MOSFETs, which operate in pairs;

providing a controller on the semiconductor chip;

generating, by the controller, a clock signal;

dividing, by a frequency divider of the controller, the frequency of the clock signal;

detecting, by the controller, a phase difference between a clock signal input to the frequency divider and a clock signal divided by the frequency divider and generating an up signal or a down signal;

generating, by the controller, a control bit by counting the up/down signals; and applying, by the controller, an internal dead-time and an external dead-time in a manner to delay an on signal during switching of two switching devices operating in pairs based on the control bit to achieve complementary switching operations, wherein the internal dead-time is controlled so as to prevent the first and second MOSFETs or the third and fourth MOSFETs, which operate in pairs, respectively, from operating at the same time in the internal circuit, and the external dead-time is controlled so as to prevent one of the first and second MOSFETs or one of the third and fourth MOSFETs, from operating at the same time.

5. The method of claim 4, wherein an up counter for counting the up signals and a down counter for counting the down signals are designed to be symmetrical to each other such that the counting is performed in the same range.

6. The method of claim 4, wherein the dead-time is determined based on the counting number of up signals or down signals.

7. The method of claim 4, wherein the dead-time period applied between two switching devices operating in pairs is shorter than the dead-time period applied between two switching devices operating in other pairs.

* * * * *